United States Patent
Budmiger (10) Patent No.: US 10,823,594 B1
(45) Date of Patent: Nov. 3, 2020

(54) MAGNETO-INDUCTIVE FLOW MEASURING DEVICE AND METHOD FOR ASCERTAINING THE PRESENCE OF A COMPLETELY DEVELOPED, ROTATIONALLY SYMMETRIC, FLOW PROFILE

(71) Applicant: Endress+Hauser Flowtec AG, Reinach (CH)

(72) Inventor: Thomas Budmiger, Hannover (CH)

(73) Assignee: Endress+Hauser FLowtec AG, Reinach (CH)

( * ) Notice: Subject to any disclaimer, the term of this patent is extended or adjusted under 35 U.S.C. 154(b) by 223 days.

(21) Appl. No.: 15/758,476

(22) PCT Filed: Jul. 26, 2016

(86) PCT No.: PCT/EP2016/067732
§ 371 (c)(1),
(2) Date: Mar. 19, 2019

(87) PCT Pub. No.: WO2017/025314
PCT Pub. Date: Feb. 16, 2017

(30) Foreign Application Priority Data

Aug. 13, 2015 (DE) .......................... 10 2015 113 390

(51) Int. Cl.
*G01F 1/58* (2006.01)
*G01F 25/00* (2006.01)
(52) U.S. Cl.
CPC .......... *G01F 1/588* (2013.01); *G01F 25/0007* (2013.01)
(58) Field of Classification Search
CPC .................................................... G01F 25/00
See application file for complete search history.

(56) References Cited

U.S. PATENT DOCUMENTS

| 4,008,609 A | 2/1977 | Lambrecht et al. |
| 4,015,471 A | 4/1977 | Marsh |

(Continued)

FOREIGN PATENT DOCUMENTS

| DE | 1914335 A1 | 12/1970 |
| DE | 2743954 A1 | 4/1979 |

(Continued)

OTHER PUBLICATIONS

Search Report for German Patent Application No. 10 2015 113 390.3, German Patent Office, dated May 9, 2016, 9 pp.

(Continued)

*Primary Examiner* — Jewel V Dowtin
(74) *Attorney, Agent, or Firm* — Christopher R. Powers; Endress+Hauser (USA) Holding Inc.

(57) ABSTRACT

A magneto-inductive flow measuring device is disclosed that includes a measuring tube with a measuring tube axis and two measuring electrodes arranged diametrally opposite one another on the measuring tube and from which a signal is tapped for ascertaining a flow. The flow measuring device includes four other electrodes in pairs arranged diametrally opposite one another on the measuring tube, forming second and third electrode axes that intersect the measuring tube axis, where the two electrode axes are arranged offset from a parallel projection of the first electrode axis onto the second cross-sectional plane by a clockwise or counter-clockwise angular measure. The flow measuring device further includes an evaluation unit for detecting a flow profile based on measurement signals tapped from the electrodes of the two electrode axes. A further aspect of the disclosure includes a method for compensating a flow profile related measurement error in a flow measurement.

15 Claims, 10 Drawing Sheets

(56) References Cited

U.S. PATENT DOCUMENTS

| | | | |
|---|---|---|---|
| 9,021,890 B2 * | 5/2015 | Rogers | G01F 1/584 73/861.12 |
| 2008/0127712 A1 | 6/2008 | Baker | |
| 2010/0089171 A1 * | 4/2010 | Voigt | G01F 1/584 73/861.12 |
| 2013/0036817 A1 | 2/2013 | Lucas et al. | |
| 2014/0230565 A1 * | 8/2014 | Graf | G01F 1/588 73/861.11 |
| 2016/0195416 A1 * | 7/2016 | Iijima | G01F 1/588 73/861.12 |
| 2017/0322060 A1 * | 11/2017 | Sakata | G01F 1/588 |

FOREIGN PATENT DOCUMENTS

| | | |
|---|---|---|
| DE | 3700165 A1 | 7/1988 |
| EP | 0878694 A1 | 11/1998 |
| GB | 2292613 A | 2/1996 |

OTHER PUBLICATIONS

Search Report for International Patent Application No. PCT/EP2016/067732, WIPO, dated Jul. 26, 2016, 14 pp.

\* cited by examiner

MAGNETO-INDUCTIVE FLOW MEASURING DEVICE AND METHOD FOR ASCERTAINING THE PRESENCE OF A COMPLETELY DEVELOPED, ROTATIONALLY SYMMETRIC, FLOW PROFILE

CROSS-REFERENCE TO RELATED APPLICATIONS

The present application is related to and claims the priority benefit of German Patent Application No. 10 2015 113 390.3, filed on Aug. 13, 2015 and International Patent Application No. PCT/EP2016/067732, filed on Jul. 26, 2016 the entire contents of which are incorporated herein by reference.

TECHNICAL FIELD

The present invention relates to a magneto-inductive flow measuring device and to a method for ascertaining the presence of a completely developed, rotationally symmetric, flow profile, as well as to a method for compensating a flow profile related, measurement error in a flow measurement.

BACKGROUND

Flow disturbances can occur in the case of flow measurements. Such cannot be completely prevented, since, for example, some flow disturbances arise from the structural conditions of a pipeline. Usually, it is recommended e.g. to place a flow measuring device in a pipeline at least a certain distance from the disturbance causing feature, e.g. an elbow or a diaphragm, in order to make sure that measurement error is minimized.

Since the flow disturbances can, however, also have different effects, depending on flow velocity, and the disturbances can also change over the course of time, e.g. due to carbonate deposits in an elbow, deposits on a diaphragm, etc., it is of interest from a user's point of view to detect, whether in the region of the flow measurement a completely developed, rotationally symmetric, flow profile is present or not. The ascertaining of such information is so far an unresolved problem.

SUMMARY

The object of the invention is achieved by a flow measuring device as defined in claim 1 and by a method as defined in claim 9.

A magneto-inductive flow measuring device of the invention includes a measuring tube, which has a measuring tube axis, and two measuring electrodes, which are arranged diametrally opposite one another on the measuring tube and from which a signal is tapped for ascertaining a flow, e.g. a volume flow rate, and/or a flow velocity. The measuring electrodes define a first electrode axis, which intersects with the measuring tube axis and wherein the measuring tube axis extends in a first cross-sectional plane, which is perpendicular to the measuring electrodes axis.

The flow measuring device includes four other electrodes, of which each two electrodes are arranged diametrally opposite one another on the measuring tube and form second and third electrode axes, which intersect with the measuring tube axis, wherein the two electrode axes lie on a second cross-sectional plane, wherein each of the two electrode axes intersects the measuring tube axis and wherein the second cross-sectional plane is perpendicular to the measuring tube axis, wherein the first of the two electrode axes is arranged offset from a parallel projection of the first electrode axis onto the second cross-sectional plane by a clockwise angular measure of less than or equal to $\pi/2$ rad and wherein the second of the two electrode axes is arranged offset from a parallel projection of the first electrode axis on the second cross-sectional plane by a counterclockwise angular measure of less than or equal to $\pi/2$ rad.

The magneto-inductive flow measuring device of the invention includes an evaluation unit, which is embodied for detecting a flow profile based on measurement signals tapped from the electrodes of the two electrode axes.

The structural construction of the flow measuring device permits, in cooperation with the evaluation unit, detecting whether a completely developed, rotationally symmetric, flow profile is present or not at the point in time of the flow measurement. The point in time of the flow measurement is, in such case, not the particular registering of a potential but, instead, reference to a continual ascertaining of measured values, in the case of which supplementally also the detecting of the flow profile is performed, in order to be able to evaluate the reliability of the ascertained flow values.

Advantageous embodiments of the invention are subject matter of the dependent claims.

Advantageously, the first and the second of the two electrode axes are arranged offset from a parallel projection of the measuring electrodes axis onto the second cross-sectional plane by an angular measure between $\pi/8$ rad and $3\pi/8$ rad. The offset can be achieved by projection in the case of rotation around the intersection with the measuring tube axis.

The first and second electrode axes can advantageously be arranged offset from a parallel projection of the first electrode axis by the same magnitude clockwise or counterclockwise.

The magneto inductive flow measuring device advantageously includes, supplementally to the four electrodes on the second cross-sectional plane, four other electrodes, of which each two electrodes are arranged diametrally opposite one another on the measuring tube and form fourth and fifth electrode axes, which intersect with the measuring tube axis; wherein the two electrode axes lie on a third cross-sectional plane, wherein each of the two electrode axes intersects the measuring tube axis and wherein the third cross-sectional plane is perpendicular to the measuring tube axis, wherein the first of the two electrode axes is arranged offset from a parallel projection of the first electrode axis on the third cross-sectional plane by a clockwise angular measure of less than or equal to $\pi/2$ rad and wherein the second of the two electrode axes is arranged offset from a parallel projection of the first electrode axis on the third cross-sectional plane by a counterclockwise angular measure of less than or equal to $\pi/2$ rad. This arrangement of four additional electrodes can be applied for plausibility checking of the results achieved by the other four electrodes.

The second and the third cross-sectional planes are advantageously, not, however, absolutely, arranged with an equal separation from the first cross-sectional plane before and after the first cross-sectional plane in the flow direction. Thus, the two (or further) additional planes can be arranged before or after the first cross-sectional plane and can also be arranged completely asymmetrically in the Z-direction.

The evaluation unit is advantageously equipped, based on tapped measured values of the four electrodes of the second cross-sectional plane and preferably also based on tapped measured values of the four electrodes of the third cross-sectional plane, to perform a compensating of a flow cross-section related, measurement error.

In such case, the evaluation unit for compensating the flow cross-section related, measurement error can perform a weighting of potential differences on the four, preferably eight, additional electrodes based on a weighting factor.

The evaluation unit can advantageously ascertain a compensated flow function and the evaluation unit can thereafter remove extrema of this flow function, e.g. by setting upper- and/or lower limits.

A method of the invention for ascertaining the presence of a completely developed, rotationally symmetric, flow profile in the case of a flow measurement by means of a magneto-inductive flow measuring device with a measuring tube, which has a measuring tube axis, and two measuring electrodes, which are arranged diametrally opposite one another on the measuring tube and from which a signal can be tapped for ascertaining a flow, e.g. a volume flow rate, and/or a flow velocity, wherein the measuring electrodes define a first electrode axis, which intersects the measuring tube axis and wherein the measuring tube axis extends in a first cross-sectional plane, which is perpendicular to the measuring electrodes axis; wherein the flow measuring device has four other electrodes, of which each two electrodes are arranged diametrally opposite one another on the measuring tube and form second and third electrode axes, which intersect with the measuring tube axis; wherein the two electrode axes lie on a second cross-sectional plane, wherein each of the two electrode axes intersects the measuring tube axis and wherein the second cross-sectional plane is perpendicular to the measuring tube axis, wherein the first of the two electrode axes is arranged offset from a parallel projection of the first electrode axis onto the second cross-sectional plane by a clockwise angular measure of less than or equal to $\pi/2$ rad and wherein the second of the two electrode axes is arranged offset from a parallel projection of the first electrode axis onto the second cross-sectional plane by a counterclockwise angular measure of less than or equal to $\pi/2$ rad, is characterized by steps as follows:

A tapping potentials of the four additional electrodes,

B ascertaining potential differences between the potentials of pairs of electrodes on the two electrode axes; and    C reconciling these potential differences with a desired value.

Advantageous embodiments of the method of the invention are subject matter of the dependent claims.

Advantageously, an error report and/or information that no completely developed, rotationally symmetric, flow profile is present are/is output, to the extent that one of the potential differences is greater than the predetermined desired value.

A method of the invention for compensating a flow profile related, measurement error in the case of a flow measurement by means of a magneto-inductive flow measuring device with a measuring tube, which has a measuring tube axis, and two measuring electrodes, which are arranged diametrally opposite one another on the measuring tube and from which a signal is tapped for ascertaining an uncompensated flow, e.g. a volume flow rate, and/or a flow velocity, wherein the measuring electrodes define a first electrode axis, which intersects the measuring tube axis and wherein the measuring tube axis extends in a first cross-sectional plane, which is perpendicular to the measuring electrodes axis; wherein the flow measuring device has four other electrodes, of which each two electrodes are arranged diametrally opposite one another on the measuring tube and form second and third electrode axes, which intersect with the measuring tube axis; wherein the two electrode axes lie on a second cross-sectional plane, wherein each of the two electrode axes intersects the measuring tube axis and wherein the second cross-sectional plane is perpendicular to the measuring tube axis, wherein the first of the two electrode axes is arranged offset from a parallel projection of the first electrode axis onto the second cross-sectional plane by a clockwise angular measure of less than or equal to $\pi/2$ rad and wherein the second of the two electrode axes is arranged offset from a parallel projection of the first electrode axis onto the second cross-sectional plane by a counterclockwise angular measure of less than or equal to $\pi/2$ rad, is characterized by steps as follows:

A tapping potentials of the four additional electrodes;

B ascertaining a plurality of potential differences between the potentials of peripherally neighboring electrodes;

C weighting the potential differences of step B and the potential difference between the potentials on the measuring electrodes;

D ascertaining one or more calibration factors from the weighted potential differences; and    E compensating uncompensated flow, e.g. volume flow rate, and/or uncompensated flow velocity based on the one or more calibration factors.

BRIEF DESCRIPTION OF THE DRAWINGS

The invention will now be described in greater detail based on the appended drawing, the figures of which show as follows.

DETAILED DESCRIPTION

Figure 16:
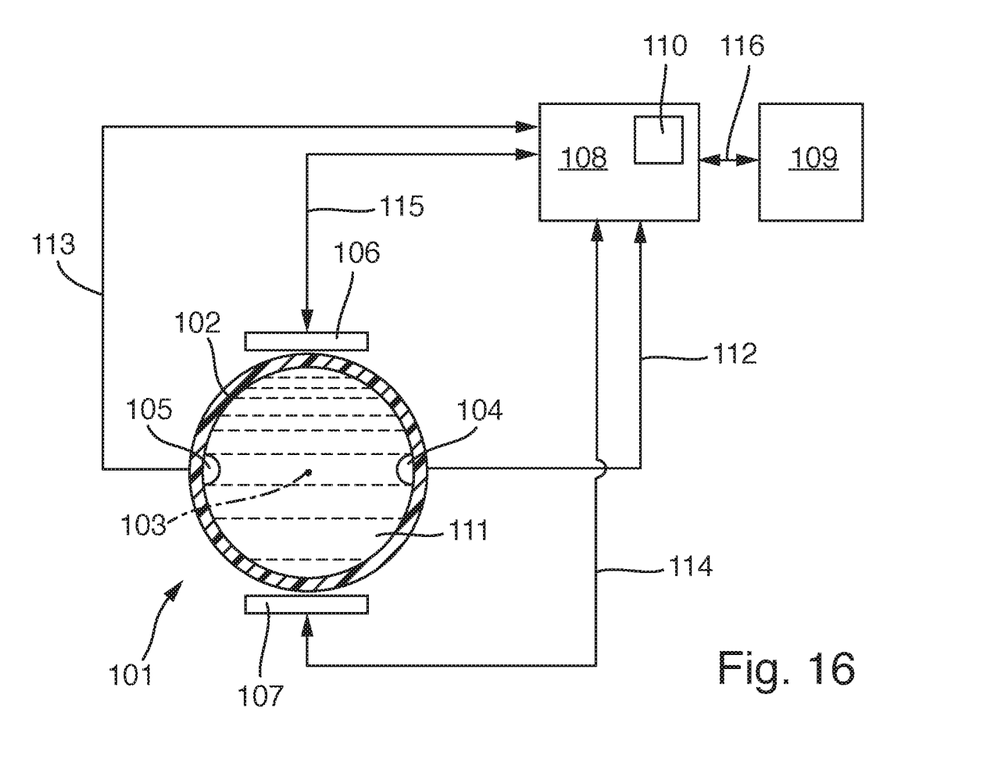
FIG. 16 shows a schematic representation of a magneto-inductive flow measuring device of the state of the art.

FIG. 16 shows a schematic representation of a flow measuring device 101 known per se, based on which the basic construction of a magneto-inductive flow measuring device will now be discussed. A measuring tube 102 of the flow measuring device has a measuring tube axis 103 and is flowed through by a medium 111. The medium 111 is electrically conductive, at least to a small extent. Measuring tube 102 is manufactured of a non-conductive material, or at least it is lined on its inner surface with a non-conductive material.

Figure 14:
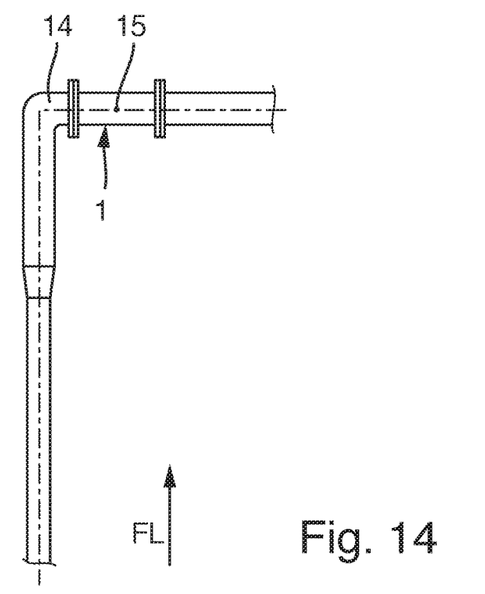
FIG. 14 shows a structure of a plant with integrated flow measuring device, wherein a flow profile analogous to that of FIG. 13 forms at point 15.

A magnetic field MF directed perpendicularly to the measuring tube axis 103 is produced via a magnet system, which is composed usually of two coil arrangements 106 and 107, e.g. magnet coils, arranged diametrically opposite one another on the measuring tube. Under the influence of the magnetic field MF, charge carriers located in the medium 111 migrate, depending on polarity, to the two oppositely poled, measuring electrodes 104, 105. These measuring electrodes form a measuring electrodes axis A, which is oriented perpendicularly to the magnetic field MF and perpendicularly to the measuring tube axis 103. The voltage forming on the measuring electrodes 104, 105 is proportional to the flow velocity of the measured medium 111 averaged over the cross-section of the measuring tube 102, i.e., assuming a fully developed flow profile of the flow of the measured medium 111, and is considered a measure for the volume flow rate of the medium 111 in the measuring tube 102. Measuring tube 102 can additionally be connected via connecting elements, e.g. flanges (not shown), with a pipe system, through which the medium 111 flows. A magneto-inductive flow measuring device integrated in such a manner using corresponding flange connections is shown by way of example in FIG. 14.

The measuring electrodes 104, 105 are located in the illustrated example in direct contact with the medium, i.e. the measured medium 111; the coupling can, however, such as already mentioned above, also be capacitive in nature.

The measuring electrodes 104, 105 can be connected via connecting lines 112, 113 with an evaluation unit 108. The connection between the coil arrangements 106, 107 and the evaluation unit 108 can occur via the connecting lines 114, 115. The evaluation unit 108 can be connected via the connecting line 116 or via a wireless signal path with an input/output unit 109.

The evaluation unit 108 can optionally have a memory unit 110 and a computing unit (not shown) and can care for the coil control. The evaluation unit, in such case, so supplies the coil arrangement 106, 107 with electrical current that the magnetic field MF periodically changes its direction.

The conventional magneto-inductive flow measuring device shown in FIG. 16 measures highly accurately, to the extent that the flow profile of the medium flowing through the measuring tube is rotationally symmetric and fully developed. Any deviation from this ideal flow profile leads to an additional measurement deviation. The subject matter of the invention enables ascertaining whether an approximately rotationally symmetric and fully developed flow profile is present. In a further development of the invention, then a deviation from the ideal flow profile can be detected and/or such deviation compensated.

Figure 1:
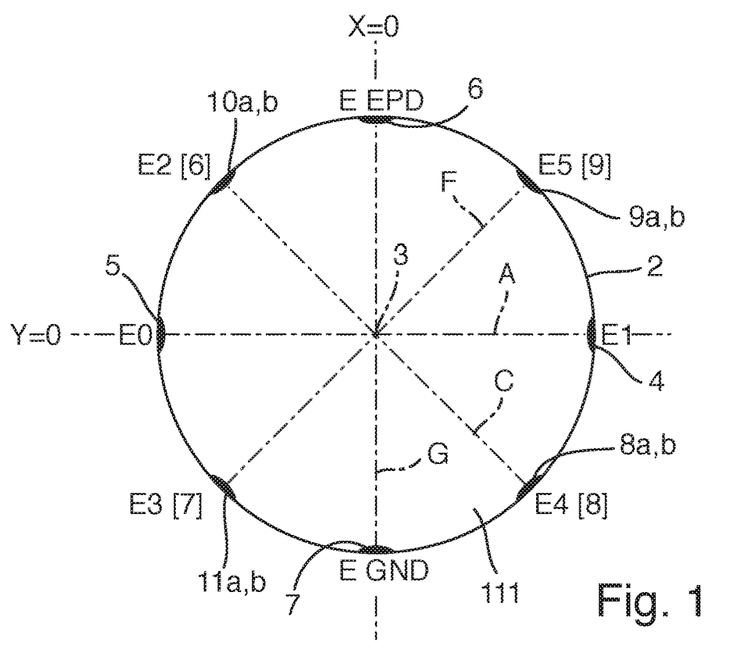
FIG. 1 shows an electrode distribution on the inner circumference of a measuring tube of a flow measuring device of the invention in a sectional view perpendicular to the measuring tube axis.
Figure 2:
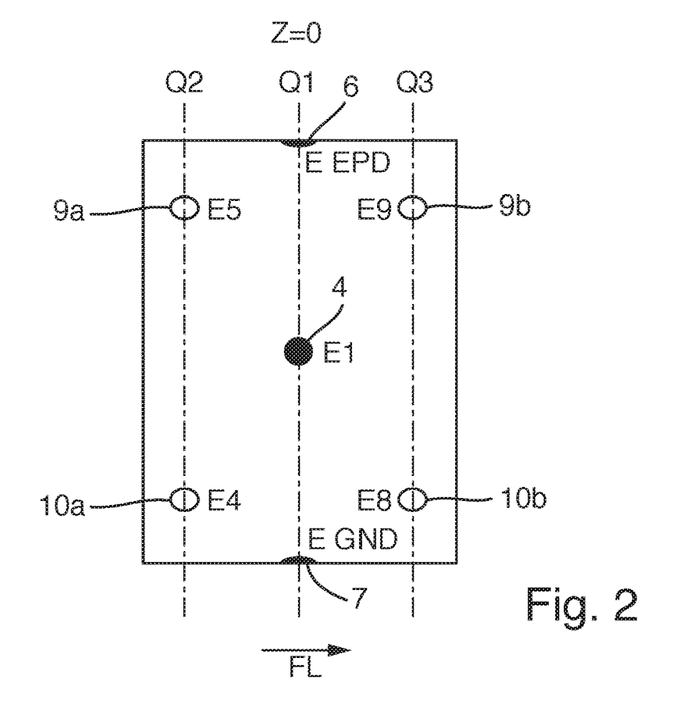
FIG. 2 shows the electrode distribution of a flow measuring device of the invention in a sectional view parallel to the measuring tube axis.

FIGS. 1 and 2 show simplified cross-sections of a magneto-inductive flow measuring device of the invention. The basic construction of a magneto-inductive flow measuring device shown in FIG. 16 is maintained. However, the measuring device shown in FIGS. 1 and 2 is supplemented with additional electrodes, which are arranged on and/or in a measuring tube 2.

The application of the two electrodes 6 and 7 is known per se. In the present invention, they are only optionally applied. Involved in the case of the electrode 6 is a so-called MMM electrode (measured material monitoring electrode) or an EPD electrode (empty pipe detection electrode), which ascertains, whether the measuring tube is full or only partially filled. This electrode 6 is located in the case of a horizontal installation at the highest point of the lumen of the measuring tube 2.

Furthermore, the electrode 7 is provided, which is embodied as a so-called grounding electrode. This is located in the case of horizontal installation of the flow measuring device at the lowest point of the lumen of the measuring tube. The electrodes 6 and 7 form, thus, an electrode axis G, which is perpendicular to the measuring electrodes axis A of the measuring electrodes 4 and 5. The measuring electrodes as well as the electrodes 6 and 7 lie preferably in a shared first cross-sectional plane Q1 of the measuring tube 2.

Moreover, there are in the embodiment of FIGS. 1 and 2 a total of eight other electrodes 8a, b through 11a, b arranged on the measuring tube 2. The present invention can, however, also be executed, for example, with only four electrodes.

Groups of four electrodes 8a to 11a or 8b to 11b are located, in such case, preferably on a second or third cross-sectional plane Q2 or Q3 of the measuring tube, thus cutting planes of the measuring tube 2, which are perpendicular to the measuring tube axis 3. To the extent that, supplemental to the two measuring electrodes 4 and 5 and the optional electrodes 6 and 7, only four other electrodes are provided, then these electrodes lie preferably together on a cross-sectional plane Q1. However, also less preferred configurations in the context of present invention are possible, wherein one or both of the two electrodes 6 and 7 lie outside of the first cross-sectional plane Q1.

Both in the case, in which only one cross-sectional plane with four electrodes is provided, as well as also in the case, in which two cross-sectional planes are provided with, in each case, four electrodes, the electrodes 8a and 10a, and 9a and 11a, as well as 8b and 10b, and 9b and 11b, can, preferably, in each case, form pairwise electrode axes C(Q2), C(Q3), F(Q2) or F(Q3), which perpendicularly intersect the measuring tube axis 3. Thus, embodied on one or both cross-sectional planes are, in each case, at least two electrode axes C and F. Of course, also yet more electrodes and other electrode axes can be arranged on the second and/or third cross-sectional plane Q2 and/or Q3.

Of the aforementioned at least two electrode axes C and F, one electrode axis is rotated clockwise with reference to the parallel projection of the measuring electrodes axis A onto the relevant cross-sectional plane Q2 or Q3 by an angular measure in a range from $\tfrac{1}{8}\pi$rad to $\tfrac{3}{8}\pi$rad from the parallel projection of the measuring electrodes axis A. The second of the two electrode axes is likewise preferably rotated by an angular measure in an analogous range counterclockwise from the parallel projection of the measuring electrodes axis A. Furthermore, preferably, the first and the second of the at least two electrode axes C and F can be oriented perpendicularly to one another.

In the especially preferred embodiment of FIG. 1, the two electrode axes are rotated by an angular measure of $\tfrac{1}{4}\pi$rad, thus by 45 degrees, from the parallel projection of the measuring electrodes axis A. In such case, one electrode axis is rotated clockwise and one electrode axis counterclockwise.

Preferably, the second cross-sectional plane Q2 is arranged on the measuring tube axis 3 in the flow direction FL before and the third cross-sectional plane Q3 after the first cross-sectional plane Q1. In the preferred embodiment of FIG. 2, the second and third cross-sectional planes Q2 and Q3 have the same separation from the first cross-sectional plane Q1.

The aforementioned electrode configuration is applied for examining a flow profile. This will now be explained in greater detail based on FIGS. 3-10.

For characterizing flow profiles, a three-dimensional coordinate system is applied, which is composed of three directional components x, y, and z, which extend perpendicularly to one another. One of the directional components, the z-directional component, extends, in such case, parallel to, and preferably coincident with, the measuring tube axis 3.

A rotationally symmetric, fully developed, flow profile should have only one directional component, namely the z-component.

The measuring device shown in FIGS. 1 and 2 was examined based on a simulation by means of a corresponding computer model for the aforementioned measuring device. The model of the measuring device was created using the finite elements method. In such case, flows were simulated, which, in each case, have only one flow direction in the x-, y- or z-direction. For all flow directions, an analogous flow velocity was assumed. Only these flows can be simulated, since flows with exclusively x- or y-components do not occur in the real case in a measuring tube.

Figure 3:
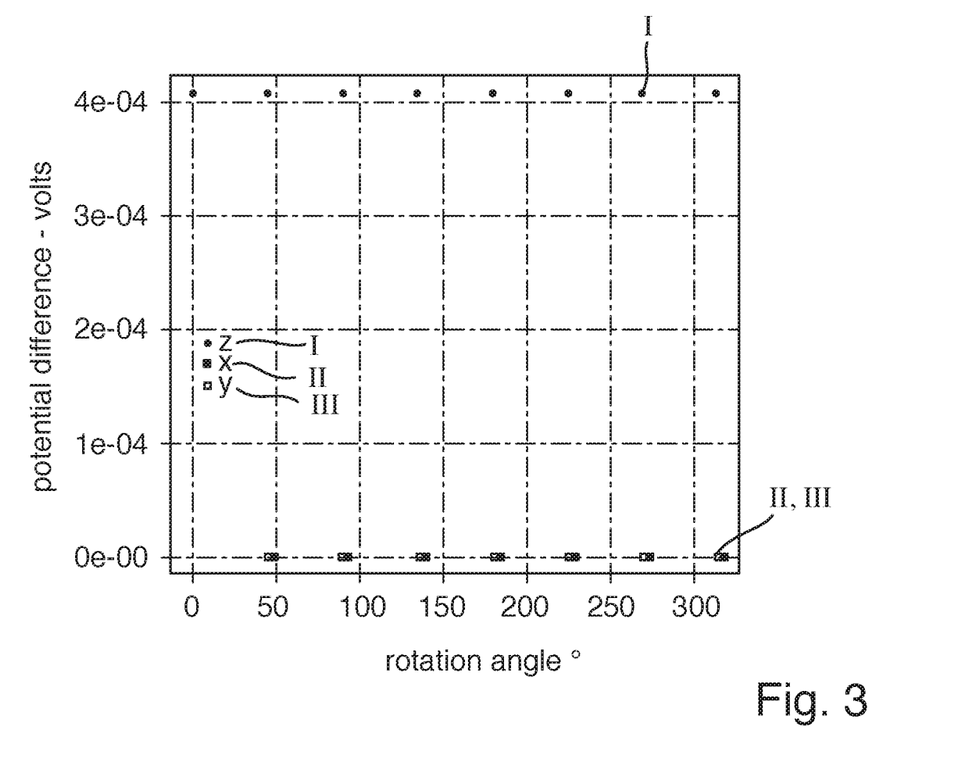
FIG. 3 shows potential differences versus angle of rotation of the flow in the case of a completely developed symmetric flow in the x-, y- and z-directions in the measuring tube in cross-sectional plane Q1.

FIG. 3 shows, firstly, the potential difference between the measuring electrodes 4 and 5 as a function of the angle of rotation, to the extent that a rotation of the flow with the fully developed, rotationally symmetric, flow profile is simulated. The flow, which has exclusively a z-component, effects a voltage difference representing the given flow velocity. There is no dependence of the tapped voltage on the angle of rotation. The flows with exclusively x- and y-components produce no voltage on the measuring electrodes. Therefore, the potential differences of these two flows are zero.

Figure 4A:
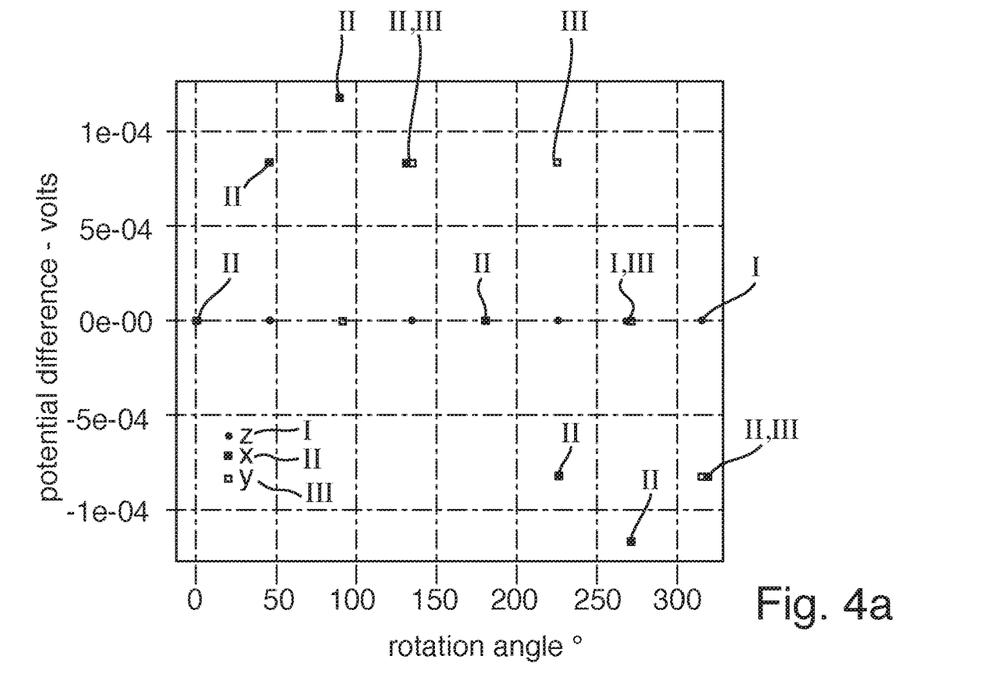
FIG. 4*a* shows potential differences versus angle of rotation of the flow referenced to a first of two electrode axes in the case of a completely developed symmetric flow in the x-, y- and z-directions in the measuring tube in the cross-sectional plane Q2.

FIG. 4a shows a potential difference between the electrodes 10a and 11a, which are arranged in the flow direction before the first of the two measuring electrodes, electrode 4, and offset from such by an angle of ±45 degrees along the tube circumference.

Figure 4B:
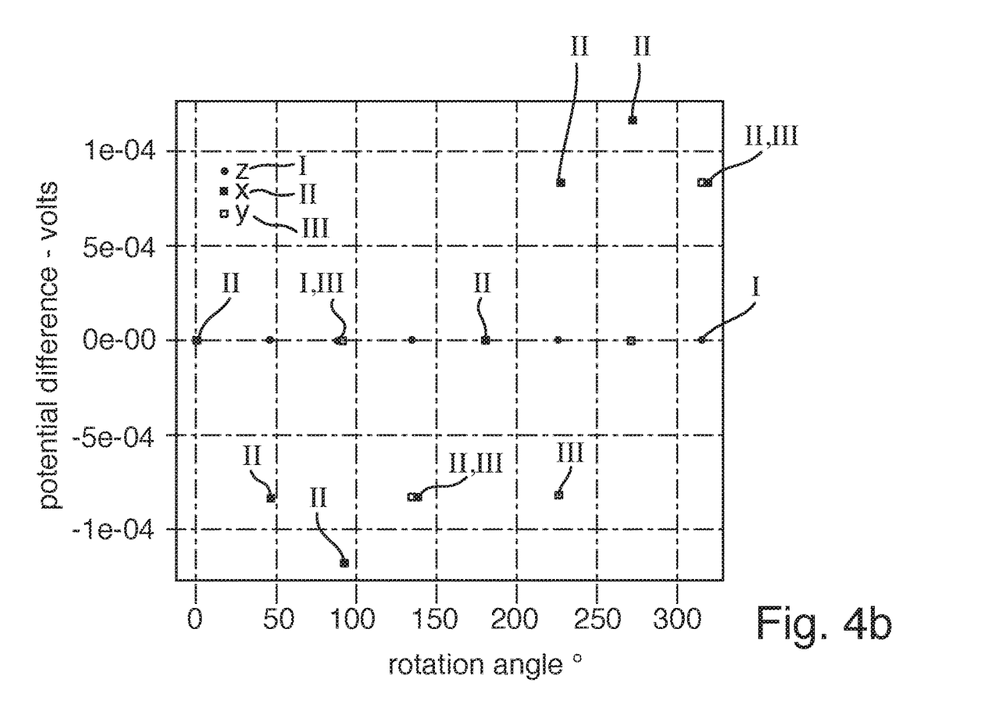
FIG. 4*b* shows potential differences versus angle of rotation of the flow referenced to a first of two electrode axes in the case of a completely developed symmetric flow in the x-, y- and z-directions in the measuring tube in the cross-sectional plane Q3.

FIG. 4b shows a potential difference between the electrodes 10b and 11b, which are arranged in the flow direction after the first of the two measuring electrodes, electrode 4, and offset from such by an angle of ±45 degrees along the tube circumference.

The potential difference of the ascertained flow with an exclusive z-component is zero. The flows with exclusively x- or y-components, in contrast, produce a potential difference, which depends on the angle of rotation of the flow. One detects, additionally, that the flow with the x-component has zero volt at 0° and at 180° and that the flow with the y-component has zero volt at 90° and 270°. The polarity of the potential differences includes reversed sign for the potential differences of FIGS. 4a and 4b.

Figure 5A:
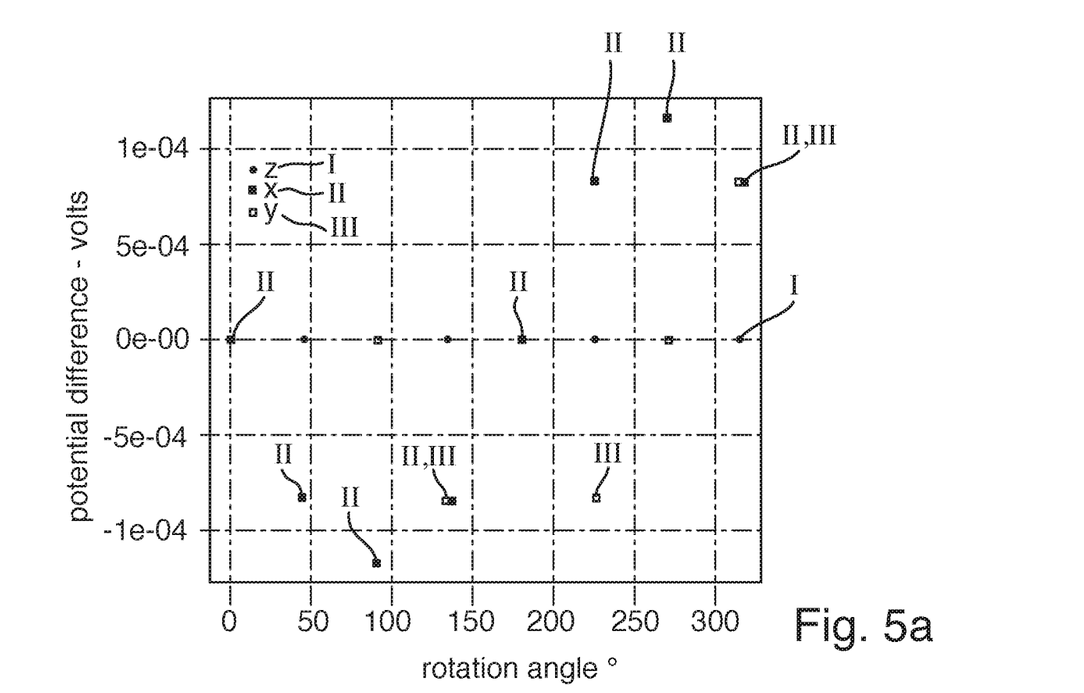
FIG. 5*a* shows potential differences versus angle of rotation of the flow referenced to a second of two electrode axes in the case of a completely developed symmetric flow in the x-, y- and z-directions in the measuring tube in the cross-sectional plane Q2.

FIG. 5a shows a potential difference between the electrodes 8a and 9a, which are arranged in the flow direction before the second of the two measuring electrodes, electrode 5, and offset from such by an angle of ±45 degrees along the tube circumference.

Figure 5B:
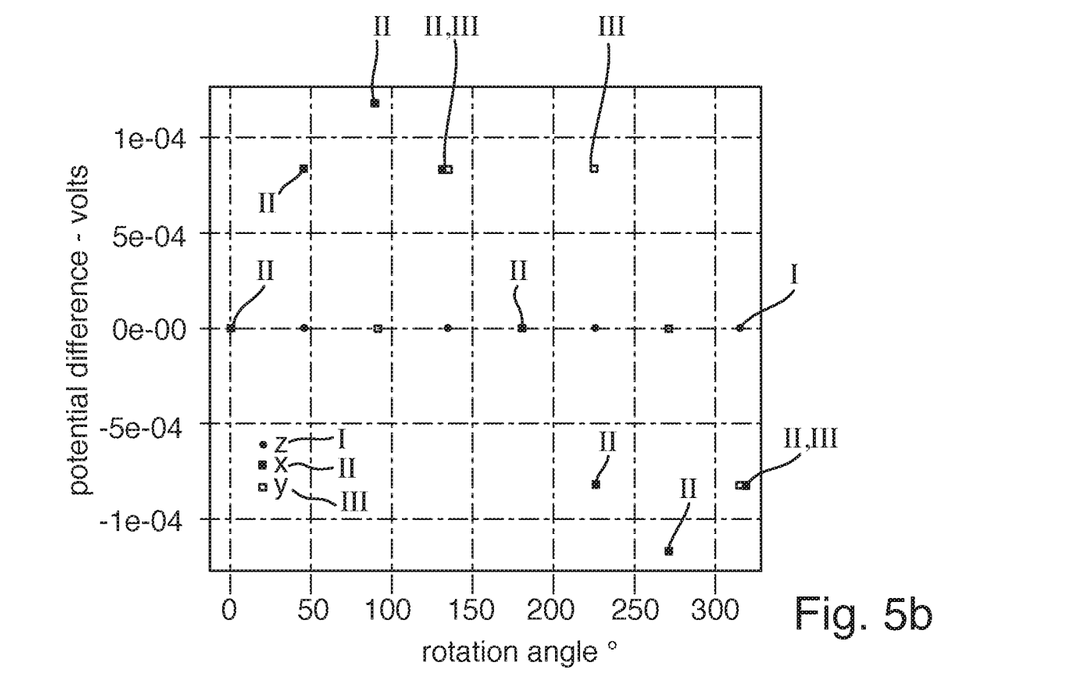
FIG. 5*b* shows potential differences versus angle of rotation of the flow referenced to a second of two electrode axes in the case of a completely developed symmetric flow in the x-, y- and z-directions in the measuring tube in the cross-sectional plane Q3.

FIG. 5b shows a potential difference between the electrodes 8b and 9b, which are arranged in the flow direction after the second of the two measuring electrodes, electrode 5, and offset from such by an angle of ±45 degrees along the tube circumference.

The ascertained potential differences have the same magnitudes as those illustrated in FIGS. 4a and 4b, however, with reversed sign.

Figure 6:
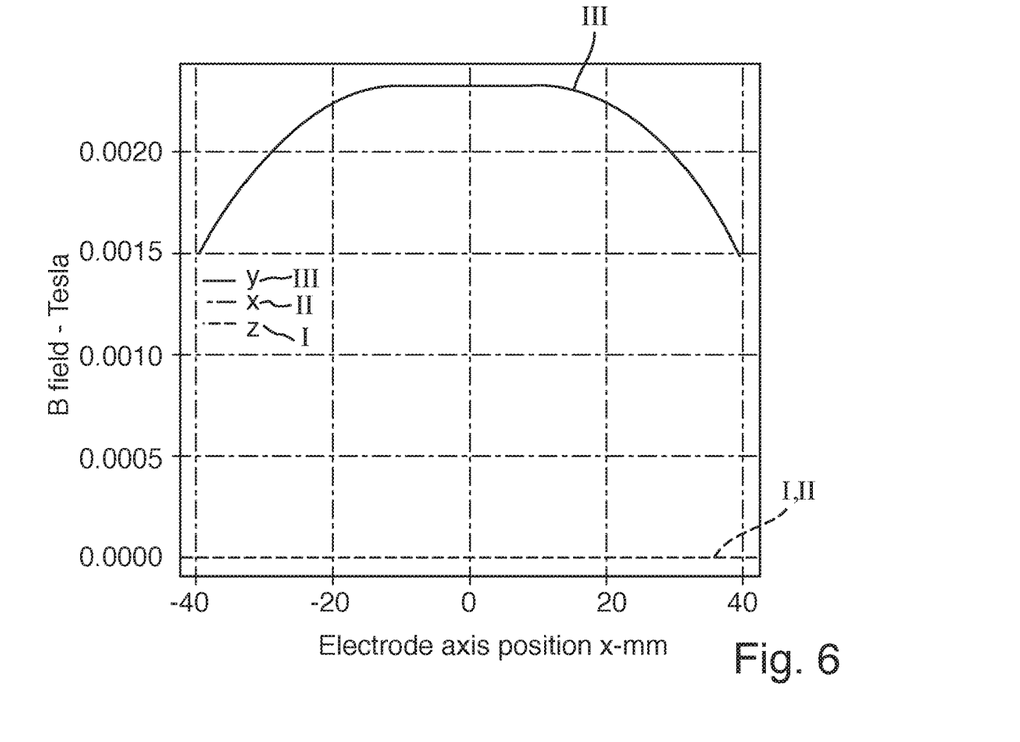
FIG. 6 shows a magnetic field distribution across the measuring tube width at the height of the measuring electrodes.

FIG. 6 shows a typical magnetic field distribution across the width of the measuring tube. The magnetic field distribution can vary. Thus, it is known, for example, to distribute the magnetic field across the cross-section via a pole shoe. Therefore, also the shape of the pole shoe plays a role, likewise a number of coils can be arranged peripherally distributed on a pole shoe, so that thus a number of coils can be provided per coil arrangement. Also, so-called saddle coils can have a magnetic field distribution different from FIG. 6. The magnetic field distribution can, consequently, be furnished in the memory unit of the corresponding evaluation unit for the particularly installed coil system in the case of a real flow measuring device and be included in the calculating. The magnetic field distribution shown in FIG. 6 corresponds, thus, to the ascertained values on the measuring electrodes and gives exclusively the MF-values for the z-component, since the x- and y-components of the rotationally symmetric, fully developed flow generate no signal between the measuring electrodes 4 and 5.

Figure 7:
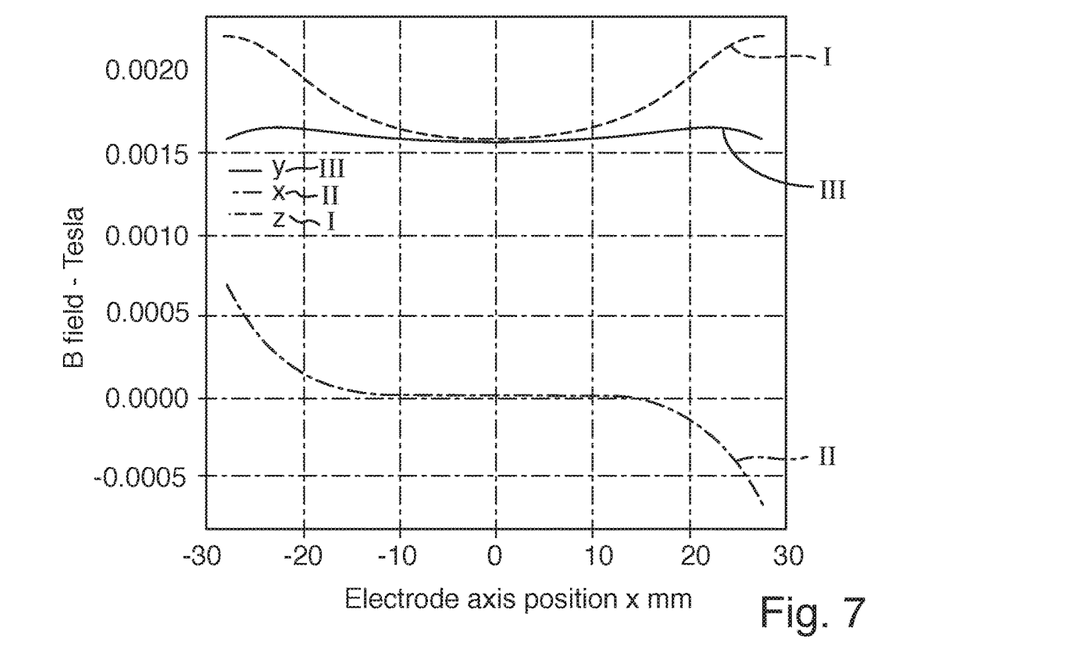
FIG. 7 shows the magnetic field distribution in the case of orientation of an electrode axis in the z-direction separated according to flows in the x-, y- and z-directions.

However, there result for the magnetic field distribution along the signal path 10a-9a in the case of simulation of flows with exclusively x-, y- and z-components the curves illustrated in FIG. 7.

Figure 8:
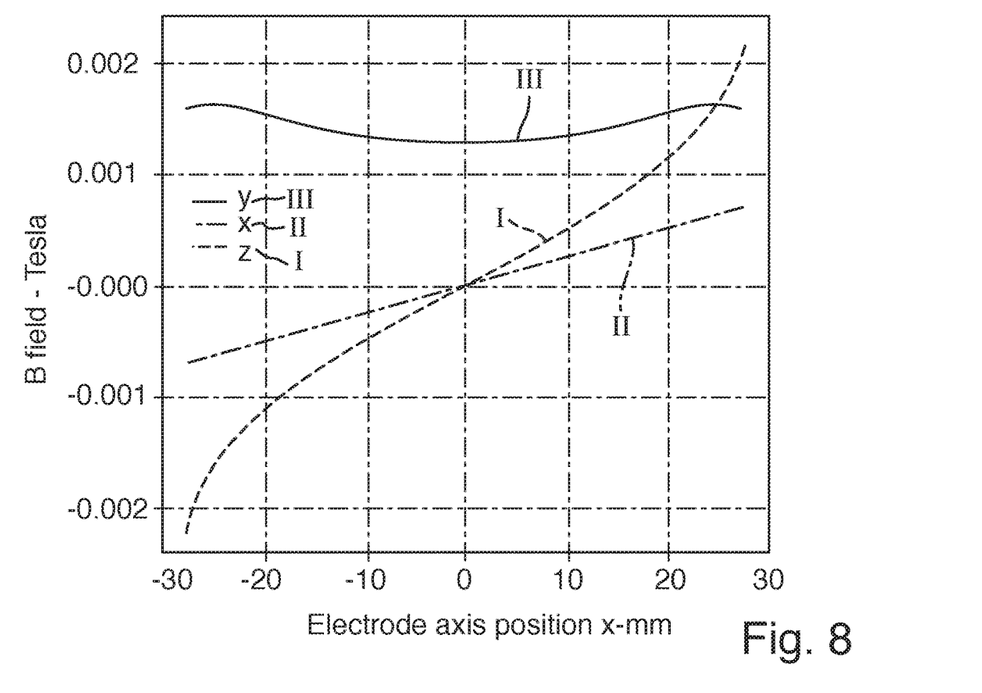
FIG. 8 shows the magnetic field distribution in the case of orientation of an electrode axis in the y-direction separated according to flows in the x-, y- and z-directions.

FIG. 8 gives the magnetic field distribution along the signal path 10a-11a.

Figure 9:
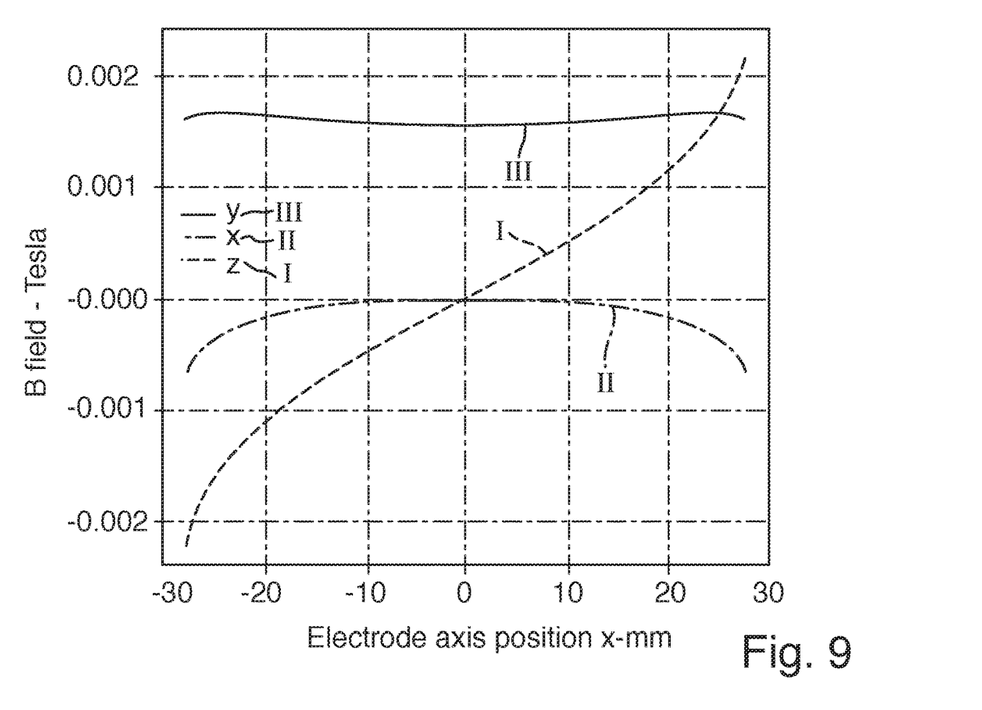
FIG. 9 shows the magnetic field distribution in the case of orientation of an electrode axis in the x-direction separated according to flows in the x-, y- and z-directions.

FIG. 9 gives the magnetic field distribution along the signal path 11a-9a.

The magnetic field distributions can then be furnished in the memory unit of the evaluation unit of a flow measuring device of the invention for flow correction under actual conditions.

Figure 10:
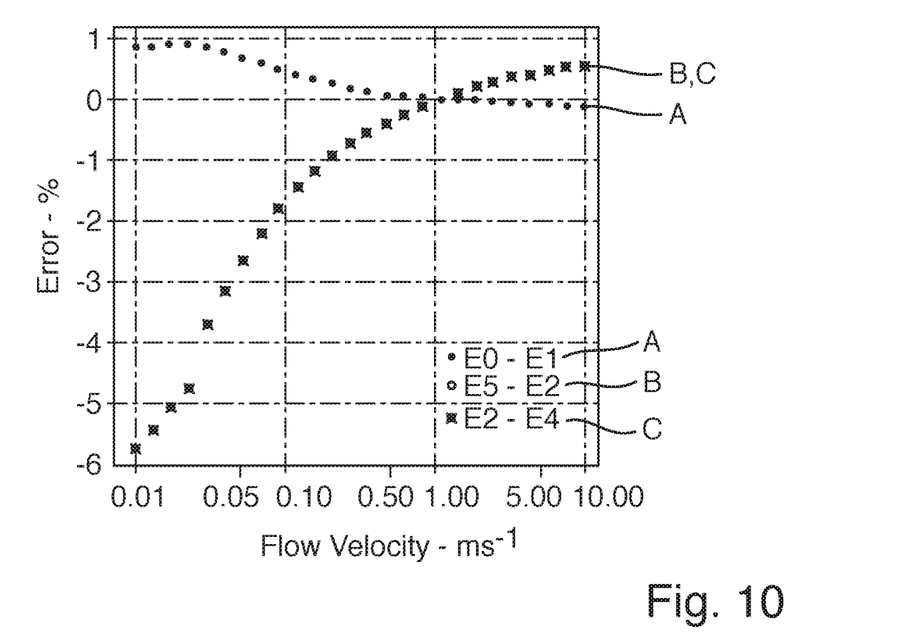
FIG. 10 is a graph of percentage measurement error as a function of flow velocity.

The linearities of a sensor can be shown e.g. based on a Schlichting flow velocity profile. FIG. 10 shows in a Schlichting profile the linearities of the signal path IV of the measuring electrodes axis 4-5, as well as the linearities of the signal paths V and VI, which are superimposed on one another, for the additional two electrode axes 9a-10a and 10a-8a.

These linearities can likewise be furnished in the memory unit of the evaluation unit.

The ascertaining of flow rate and/or flow velocity occurs by signal tapping on the measuring electrodes 4 and 5, scaled to the sensitivity of the sensor. The sensitivity can be furnished in the memory unit of the evaluation unit. The voltage tapped on the measuring electrodes is proportional to the flow velocity in the z-direction. This flow velocity corresponds to the actual flow velocity in the case of a rotationally symmetric, completely developed, flow profile.

Following these preliminary considerations and simulations, measurement operation of an actually operating flow measuring device and especially its signal processing by the evaluation unit will now be explained in greater detail.

Figure 11:
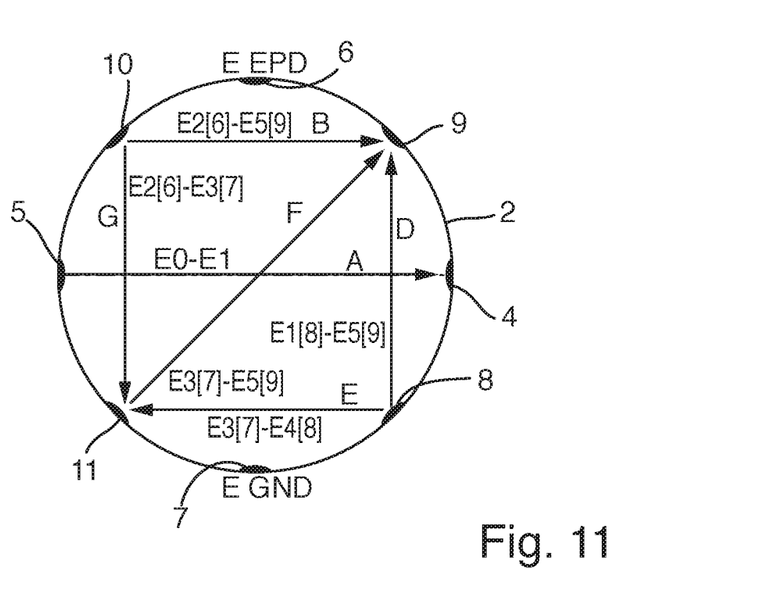
FIG. 11 shows a representation of individual signal paths, which can be taken into consideration in the signal processing for compensating a flow profile dependent; measurement error.

FIG. 11 and FIG. 2 will be used. The reference characters A, C and F represent, in such case, signal paths along electrode axes, which intersect the measuring tube axis 3, while B, D, E and G represent signal paths, which do not extend along electrode axes, which intersect the measuring tube axis 3. Reference character A is, in such case, the signal path along the measuring electrodes axis.

The following definitions hold for the potentials, which are tapped on the electrodes of FIG. 11:

electrode $4 = E_0$
electrode $5 = E_1$
electrode $6 = E_{EPD}$ ("empty pipe detection")
electrode $7 = E_{GND}$ ("grounding")
electrode $8a = E_4$
electrode $8b = E_8$
electrode $9a = E_5$
electrode $9b = E_9$
electrode $10a = E_2$
electrode $10b = E_6$
electrode $11a = E_3$
electrode $11b = E_7$ First, the potential differences $(E_2-E_3)$ and $(E_4-E_5)$ on the signal paths B and C on the second cross-sectional plane Q2 are ascertained. If the two potential differences are zero, then a completely developed, rotationally symmetric profile is present and the flow velocity ascertained from the measured potential difference $(E_0-E_1)$ corresponds to the actual flow velocity.

The result of the difference forming need not be absolutely zero, but, instead, a desired value DV can be established, which, for example, is close to zero, but allows small measurement deviations.

As already described for the structural construction of the magneto-inductive flow measuring device of the invention in FIGS. 1 and 2, a second cross-sectional plane Q2 with four electrodes is sufficient. However, the flow measuring device can advantageously be supplemented with a third cross-sectional plane Q3 with yet again four preferably identically arranged electrodes. In this way, measurement error, e.g. due to accretion formation on the electrodes or the like, can be compensated.

To the extent that supplemental to the usual electrodes installed in a magneto-inductive flow measuring device in the case of application of eight additional electrodes 8a,b-11a,b the following inequalities are fulfilled:

$Ip = (E_2 - E_3 + E_8 - E_9)/2 \leq DV$, and $Ir = (E_4 - E_5 + E_6 - E_7)/2 \leq DV$, the user can then assume the presence of a fully developed, rotationally symmetric, flow profile being present in the flow measurement. The measurement error of the ascertained flow rate values and/or flow velocities is correspondingly small. The presence of a rotationally symmetric, completely developed, flow profile can then be displayed to the user by the output unit.

Based on the difference forming, additionally information can be gained concerning the extent to which the actual flow profile deviates from a completely developed, rotationally symmetric, flow profile. A difference value can likewise be displayed by the output unit.

In a further development of the method, also a compensating of the changed flow profile can occur.

For compensating the measurement effect of the flow profile, weighted fractions of the potential differences $(E_2-E_5)$, $(E_6-E_9)$, $(E_3-E_4)$ and $(E_7-E_8)$ must be calculated with an empirical weighting factor.

$$\omega_{factor} = \frac{\pi}{2} \cdot \left( CALF_{tb} \cdot \sqrt{1 + \frac{(E_0 - E_1) \cdot CALF_{nominal}}{U_{nom}}} \right)$$

$w_{factor}$ is, in such case, the weighting factor, $CALF_{nominal}$ is the value for the nominal sensitivity of the flow measuring device divided by the actually ascertained sensitivity using the measured potential difference $(E_0-E_1)$ on the measuring electrodes 4 and 5 under the reference conditions selected for the nominal sensitivity.

$CALF_{tb}$ is the value for the nominal sensitivity of the flow measuring device divided by the actually ascertained sensitivity using the measured potential difference $(E_3-E_4)$ or $(E_5-E_2)$ under the reference conditions selected for the nominal sensitivity.

$U_{nom}$ is the nominal sensitivity of the flow measuring device, i.e. of the sensor (provided by the manufacturer based on reference conditions).

Using the weighting factor, $w_{factor}$, then the compensation values can be ascertained taking $CALF_{tb}$ into consideration.

$$U_{std} = E_0 - E_1 \quad (4)$$
$$U_{top\ in} = E_2 - E_5$$
$$U_{top\ out} = E_6 - E_9$$
$$U_{bottom\ in} = E_3 - E_4$$
$$U_{bottom\ out} = E_7 - E_8$$

$$cval_{top} = U_{std} - CALF_{tb} \times \frac{w_{factor} \times U_{top\ in} + U_{top\ out}}{1 + w_{factor}} \quad (5)$$

$$cval_{bottom} = U_{std} - CALF_{tb} \times \frac{w_{factor} \times U_{bottom\ in} + U_{bottom\ out}}{1 + w_{factor}} \quad (6)$$

where $cval_{top}$ is the weighted part of the upper measurement signal; $cval_{bottom}$ is the weighted part of the lower measurement signal (see FIG. 11).

For complete registering of the flow distribution, the inflow values and the outflow values of the measurement signals are considered, thus tapped measurement signals on electrode axes, which lie before or after $E_0-E_1$, which are on the second and/or third cross-sectional planes Q2 and/or Q3 and extend parallel to the perpendiculars of the measuring electrodes axis A, which lies on the first cross-sectional plane Q1. When the calculated value is high, i.e. exceeds an upper desired value DV2, then it can be assumed that the flow distribution has no significant effect and its compensation can remain not taken into consideration.

From the different potential differences, the sum of the ratios $c_{lim}$ between the pairs is ascertained according to (7).

$$c_{lim} = \left| \frac{E_2 - E_3}{E_6 - E_7} + \frac{E_4 - E_5}{E_8 - E_9} \right| \qquad (7)$$

Using the results from (4), (5), (6) and (7), a compensated measurement result is calculated, wherein $C_{x\,45,\,90}$ and $C_{z\,45,\,90}$ are sensitivities for x- and z-flow components at a predetermined angle. These are calculated e.g. based on a sensor model furnished in the memory unit.

$$c_{factor} = \sqrt{\left(\frac{C_{x45}}{C_{z45}}\right)^2 + \left(\frac{C_{x90}}{C_{z90}}\right)^2}$$

$$U_{tmp} = \begin{cases} U_{std} \\ U_{std} - \dfrac{cval_{top} + cval_{bottom}}{c_{factor}} \end{cases},$$

Due to the DV2-specification in this formula, extrema can occur, which one can, however, advantageously remove from the calculation:

Following removal is proposed for minima:

$$m_{factor} = \frac{2 \cdot (radius^2 \cdot \pi)^2}{c_{factor}}$$

$$c_{tmp} = \left| \frac{lp}{U_{tmp}} \right| + \left| \frac{lr}{U_{tmp}} \right|$$

$$U_{tmp2} = \begin{cases} U_{tmp} \\ U_{tmp} + (c_{tmp} - 1) \cdot m_{factor} \end{cases},$$

$U_{tmp2} = U_{tmp}$, when $c_{tmp} < 1$, otherwise

Following removal is proposed for minima:

$$U_{flow} = \begin{cases} U_{tmp2} \\ U_{tmp2} - c_{tmp} \cdot 2 \cdot c_{factor} \cdot m_{factor} \end{cases},$$

$U_{flow} = U_{tmp2}$, when $c_{tmp} > 0.1$.

Figure 12:
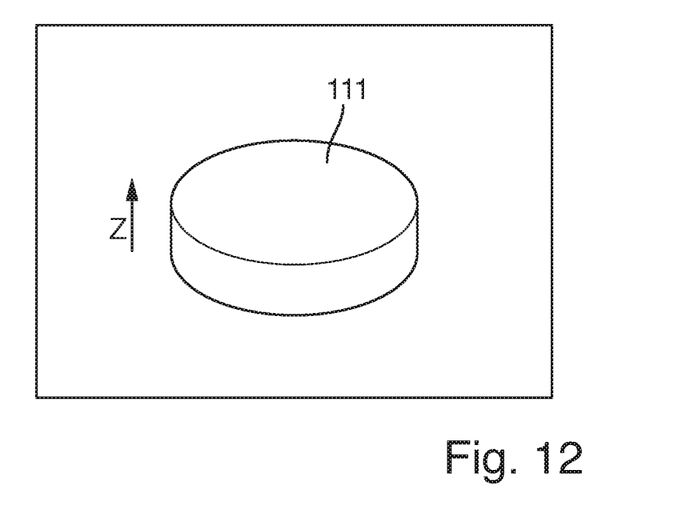
FIG. 12 shows a representation of a completely developed, rotationally symmetric, flow profile.

FIG. 12 shows a rotationally symmetric, completely developed, flow profile.

Figure 13:
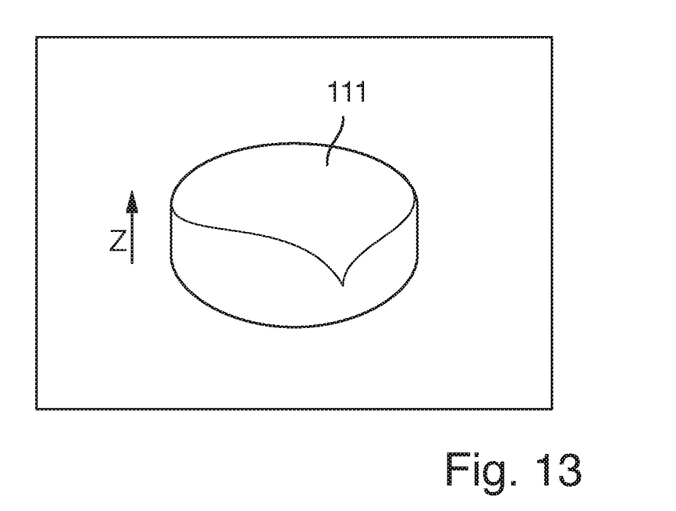
FIG. 13 shows a representation of a disturbed flow profile.

FIG. 13 shows a disturbed flow profile. The disturbance occurred in a plant, in which the flow measuring device of the invention was installed directly after a 90°-bend 14. In such case, FIG. 13 represents the flow profile at the position 15, such as occurs at the level of the measuring electrodes of the magneto-inductive flow meter 1.

Figure 15:
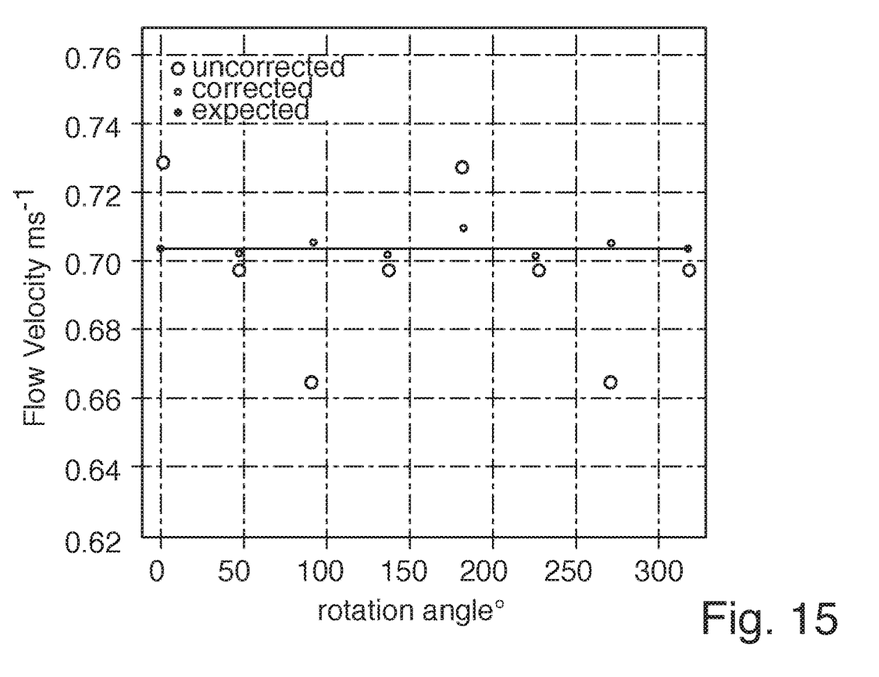
FIG. 15 is a graph of flow velocity of a rotating flow having a flow profile analogous to that of FIG. 13, with uncorrected, corrected and ideally expected flow velocities.

FIG. 15 shows the uncorrected flow, the expected flow in the form of a line and the corrected flow. As one can see from FIG. 15, the corrected flow values exhibited significantly smaller fluctuations. On the whole, the illustrated values indicate an improvement of the measurement deviation from the actual flow by a factor of 7.92.

The experiment was additionally performed with other flow disturbing bodies and disturbed flow profiles resulting therefrom. Depending on strength of the flow disturbance, improvements in the case of application of the flow measuring device of the invention and the special embodiment of the applied method of the invention by factors between 1.9 to approximately 10 were obtained.

The invention claimed is:

1. A magneto-inductive flow measuring device comprising:
a measuring tube having a measuring tube axis and including two measuring electrodes from which a signal is tapped for ascertaining a flow condition, the measuring electrodes arranged diametrally opposite one another on the measuring tube such as to define a first electrode axis that intersects the measuring tube axis, wherein the measuring tube axis extends in a first cross-sectional plane perpendicular to the measuring electrodes axis;
four other electrodes arranged in pairs, each pair arranged diametrally opposite one another on the measuring tube such as to define a second electrode axis and a third electrode axis, respectively, wherein the second and third electrode axes lie on a second cross-sectional plane, which is perpendicular to the measuring tube axis, such that the second and third electrode axes intersect the measuring tube axis,
wherein the second electrode axis is arranged offset from a parallel projection of the first electrode axis onto the second cross-sectional plane by a clockwise angular measure of less than or equal to π/2 radian, and
wherein the third electrode axis is arranged offset from a parallel projection of the first electrode axis on the second cross-sectional plane by a counterclockwise angular measure of less than or equal to π/2 radian; and
an evaluation unit configured to detect a flow profile based on measurement signals tapped from the other electrodes of the second and third electrode axes.

2. The magneto-inductive flow measuring device of claim 1, wherein the second electrode axis and the third electrode axis are arranged offset from a parallel projection of the measuring electrodes axis onto the second cross-sectional plane by an angular measure between π/8 radian and 3π/8 radian.

3. The magneto-inductive flow measuring device of claim 1, wherein the second electrode axis and the third electrode axis are arranged offset clockwise or counterclockwise with the same magnitude from a parallel projection of the first electrode axis.

4. The magneto-inductive flow measuring device of claim 1, further comprising:
four further electrodes arranged in pairs, each further pair arranged diametrally opposite one another on the measuring tube such as to define a fourth electrode axis and fifth electrode axis, wherein the fourth and fifth electrode axes lie on a third cross-sectional plane, which is perpendicular to the measuring tube axis, such that the fourth and fifth electrode axes intersect the measuring tube axis,
wherein the fourth electrode axis is arranged offset from a parallel projection of the first electrode axis onto the third cross-sectional plane by a clockwise angular measure of less than or equal to π/2 radian, and
wherein the fifth electrode axis is arranged offset from a parallel projection of the first electrode axis onto the third cross-sectional plane by a counterclockwise angular measure of less than or equal to π/2 radian.

5. The magneto-inductive flow measuring device of claim 4, wherein the second cross-sectional plane and the third cross-sectional plane are arranged with equal separations in the flow direction before and after the first cross-sectional plane.

6. The magneto-inductive flow measuring device of claim 1, wherein the evaluation unit is further configured to perform a compensation of a flow cross-section related measurement error based on tapped measured values of the other electrodes in the second cross-sectional plane.

7. The magneto-inductive flow measuring device of claim 6, wherein the evaluation unit is further configured to perform a compensation of a flow cross-section related measurement error based on tapped measured values of the other electrodes in the second cross-sectional plane and on tapped measured values of the further electrodes in the third cross-sectional plane.

8. The magneto-inductive flow measuring device of claim 1, wherein the evaluation unit is further configured to perform a weighting of potential differences on the other electrodes in the second cross-sectional plane based on a weighting factor.

9. The magneto-inductive flow measuring device of claim 8, wherein the evaluation unit is further configured to perform a weighting of potential differences on the other electrodes in the second cross-sectional plane and on the further electrodes in the third cross-sectional plane based on a weighting factor.

10. The magneto-inductive flow measuring device of claim 1, wherein the evaluation unit is further configured to ascertain a compensated flow function and to remove extrema of the compensated flow function.

11. The magneto-inductive flow measuring device of claim 1, wherein the flow condition is a volume flow rate and/or a flow velocity.

12. A method for ascertaining the presence of a completely developed, rotationally symmetric, flow profile in a flow measurement, the method comprising:
providing a magneto-inductive flow measuring device, the magneto-inductive flow measuring device including:
a measuring tube having a measuring tube axis and including two measuring electrodes from which a signal is tapped for ascertaining a flow condition, the measuring electrodes arranged diametrally opposite one another on the measuring tube such as to define a first electrode axis that intersects the measuring tube axis, wherein the measuring tube axis extends in a first cross-sectional plane perpendicular to the measuring electrodes axis;
four other electrodes arranged in pairs, each pair arranged diametrally opposite one another on the measuring tube such as to define a second electrode axis and a third electrode axis, respectively, wherein the second and third electrode axes lie on a second cross-sectional plane, which is perpendicular to the measuring tube axis, such that the second and third electrode axes intersect the measuring tube axis,
wherein the second electrode axis is arranged offset from a parallel projection of the first electrode axis onto the second cross-sectional plane by a clockwise angular measure of less than or equal to $\pi/2$ radian, and
wherein the third electrode axis is arranged offset from a parallel projection of the first electrode axis on the second cross-sectional plane by a counterclockwise angular measure of less than or equal to $\pi/2$ radian; and
an evaluation unit configured to detect a flow profile based on measurement signals tapped from the other electrodes of the second and third electrode axes;
tapping potentials of the four other electrodes of the second and third electrode axes;
ascertaining potential differences between the potentials of the pairs of the other electrodes of the second and third electrode axes; and
reconciling the potential differences with a desired value.

13. The method of claim 12, further comprising:
outputting an error report and/or information that no completely developed, rotationally symmetric, flow profile is present when one of the potential differences is greater than the desired value.

14. A method for compensating a flow profile related measurement error in a flow measurement, the method comprising:
providing a magneto-inductive flow measuring device, the magneto-inductive flow measuring device including:
a measuring tube having a measuring tube axis and including two measuring electrodes from which a signal is tapped for ascertaining a flow condition, the measuring electrodes arranged diametrally opposite one another on the measuring tube such as to define a first electrode axis that intersects the measuring tube axis, wherein the measuring tube axis extends in a first cross-sectional plane perpendicular to the measuring electrodes axis;
four other electrodes arranged in pairs, each pair arranged diametrally opposite one another on the measuring tube such as to define a second electrode axis and a third electrode axis, respectively, wherein the second and third electrode axes lie on a second cross-sectional plane, which is perpendicular to the measuring tube axis, such that the second and third electrode axes intersect the measuring tube axis,
wherein the second electrode axis is arranged offset from a parallel projection of the first electrode axis onto the second cross-sectional plane by a clockwise angular measure of less than or equal to $\pi/2$ radian, and
wherein the third electrode axis is arranged offset from a parallel projection of the first electrode axis on the second cross-sectional plane by a counterclockwise angular measure of less than or equal to $\pi/2$ radian; and
an evaluation unit configured to detect a flow profile based on measurement signals tapped from the other electrodes of the second and third electrode axes;
tapping potentials of the measuring electrodes and of the four other electrodes of the second and third electrode axes;
ascertaining a plurality of potential differences between the potentials of peripherally neighboring electrodes and a measuring potential difference between the potentials on the measuring electrodes;
weighting the plurality of potential differences and the measuring potential difference between the potentials on the measuring electrodes;
ascertaining one or more calibration factors from the weighted potential differences; and
compensating an uncompensated flow condition based on the one or more calibration factors.

15. The method of claim 14, wherein the uncompensated flow condition is a volume flow rate and/or a flow velocity.

* * * * *